US009587927B2

(12) United States Patent
Tan et al.

(10) Patent No.: US 9,587,927 B2
(45) Date of Patent: Mar. 7, 2017

(54) HIGH SPEED HIGH RESOLUTION HETERODYNE INTERFEROMETRIC METHOD AND SYSTEM

(71) Applicant: HARBIN INSTITUTE OF TECHNOLOGY, Harbin, Heilongjiang (CN)

(72) Inventors: Jiubin Tan, Heilongjiang (CN); Pengcheng Hu, Heilongjiang (CN); Xiaofei Diao, Heilongjiang (CN)

(73) Assignee: HARBIN INSTITUTE OF TECHNOLOGY, Nangang District, Harbin, Heilongjiang (CN)

( * ) Notice: Subject to any disclaimer, the term of this patent is extended or adjusted under 35 U.S.C. 154(b) by 119 days.

(21) Appl. No.: 14/378,880

(22) PCT Filed: Nov. 8, 2012

(86) PCT No.: PCT/CN2012/084266
§ 371 (c)(1),
(2) Date: Aug. 14, 2014

(87) PCT Pub. No.: WO2014/043984
PCT Pub. Date: Mar. 27, 2014

(65) Prior Publication Data
US 2015/0043004 A1  Feb. 12, 2015

(30) Foreign Application Priority Data

Sep. 19, 2012  (CN) .......................... 2012 1 0347063

(51) Int. Cl.
*G01B 9/02* (2006.01)
*G01J 9/04* (2006.01)
(Continued)

(52) U.S. Cl.
CPC ..... *G01B 9/02007* (2013.01); *G01B 9/02003* (2013.01); *G01B 9/02027* (2013.01);
(Continued)

(58) Field of Classification Search
CPC ............ G01B 9/02007; G01B 9/02017; G01B 9/02018; G01B 9/02019; G01B 9/02045; G01B 2290/70
See application file for complete search history.

(56) References Cited

U.S. PATENT DOCUMENTS 4,334,778 A * 6/1982 Pardue ............... G01B 9/02007
356/486
5,379,115 A * 1/1995 Tsai ................... G01B 9/02019
356/487

(Continued)

*Primary Examiner* — Michael A Lyons
(74) *Attorney, Agent, or Firm* — Global IP Services; Tianhua Gu

(57) ABSTRACT

A high speed high resolution heterodyne interferometric method and system are provided. The invention uses two spatially separated beams with slightly different frequencies and has two measurement signals with opposite Doppler shift. The switching circuit selects one of the two measurement signals for displacement measurement according to the direction and speed of the target movement. In this invention, the measurement is insensitive to the thermal variation; the periodic nonlinearity is essentially eliminated by using two spatially separated beams; the measurable target speed of the interferometer is no longer limited by the beat frequency of the laser source.

3 Claims, 1 Drawing Sheet

(51) Int. Cl.
*G01B 11/14* (2006.01)
*G02B 27/28* (2006.01)
(52) U.S. Cl.
CPC .......... *G01B 9/02045* (2013.01); *G01B 11/14* (2013.01); *G01J 9/04* (2013.01); *G01B 2290/70* (2013.01); *G02B 27/283* (2013.01)

(56) References Cited

U.S. PATENT DOCUMENTS

| | | | | |
|---|---|---|---|---|
| 5,818,588 A | * | 10/1998 | Matsumoto | G01D 5/266 356/487 |
| 2003/0053079 A1 | * | 3/2003 | Hill | G03F 7/70775 356/520 |

* cited by examiner

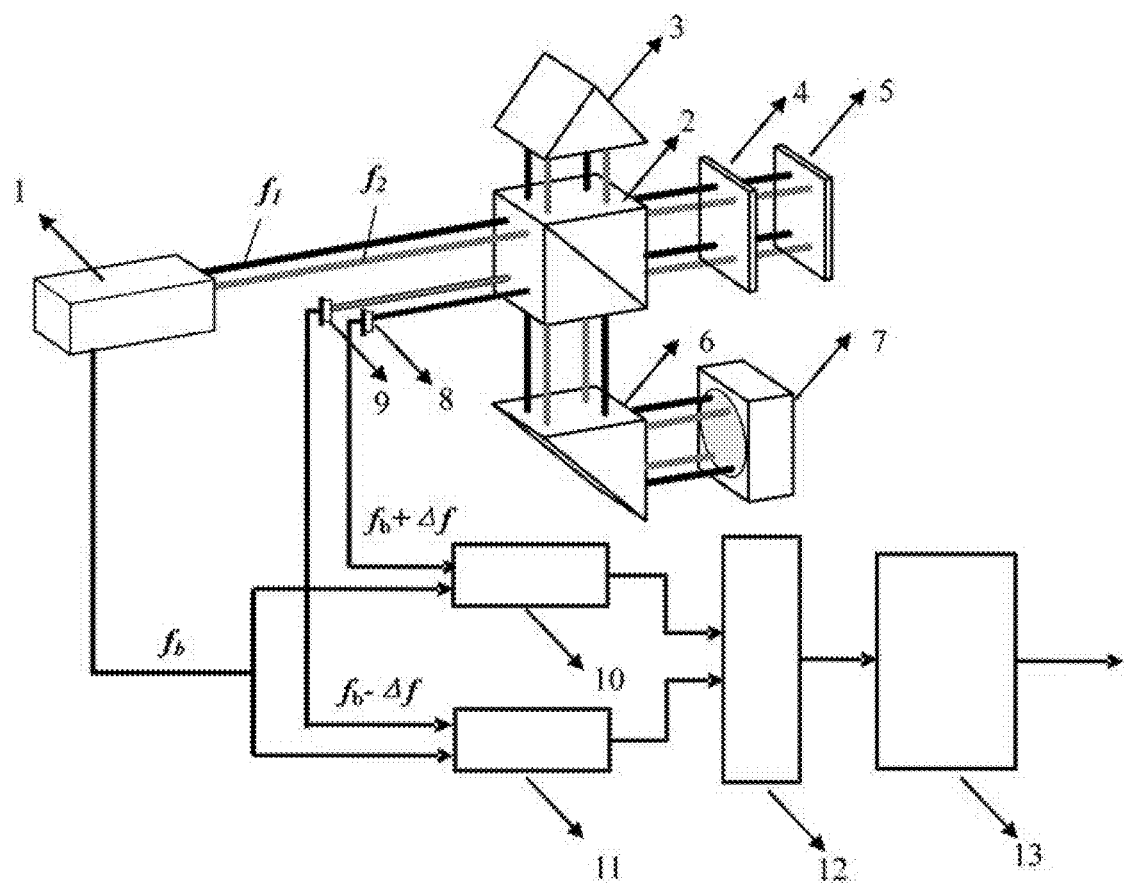

ial stage of PCT/
HIGH SPEED HIGH RESOLUTION HETERODYNE INTERFEROMETRIC METHOD AND SYSTEM

CROSS REFERENCE TO RELATED PATENT APPLICATION

The present application is the US national stage of PCT/CN2012/084266 filed on Nov. 8, 2012, which claims the priorities of the Chinese patent applications No. 201210347063.5 filed on Sep. 19, 2012, which applications are incorporated herein by reference.

BACKGROUND OF THE INVENTION

Technical Field of the Invention

The present invention relates to a high speed high resolution heterodyne interferometric method and system, which can be used for measuring a high speed target using a laser source with low beat frequency.

Technical Background

The heterodyne interferometer has been widely used in many precision machines and calibration services due to its large measuring range, high signal-to-noise ratio and high measurement precision. Nowadays, high resolution, high speed and high accuracy measurements are required for many applications in order to produce small features with competitive production throughput. This initiates an improvement of the performance of the heterodyne interferometer to satisfy industrial demands.

The periodic nonlinearity caused by frequency and polarization mixing effects limits the accuracy and resolution of a heterodyne interferometer. A lot of research has been done to reduce the periodic errors, but the traditional heterodyne interferometer can not eliminate the frequency and polarization mixing effects, which make it difficult to realized high resolution and high precision displacement measurement.

T. L. Schmitz and J. F. Beckwith proposed a heterodyne interferometer with a acousto-optic modulator as a beam splitter. The measurement beam and the reference beam are spatially separated, which can reduce the frequency and polarization mixing effects. Therefore, the periodic nonlinearity is reduced; the precision and resolution are also improved. But its specific and complicated configuration limits the typically possible applications for measuring displacement.

Ki-Nam Joo, Jonathan D. Ellis, et al. proposed a simple heterodyne interferometer, which has spatially separated reference beam and measurement beam. This interferometer can eliminate the frequency and polarization mixing effects. The periodic nonlinearity is also eliminated and the precision is improved. Its configuration is simple which make it applicable to precision industrial engineering. But the measurement speed is limited by the beat frequency of laser source.

In conclusion, the existing methods and apparatuses described above isn't suitable for high resolution, high speed and high accuracy measurements.

SUMMARY OF THE INVENTION

One purpose of this invention is to provide a high speed high resolution heterodyne interferometric method and system, which is suitable for high resolution, high speed and high accuracy measurements.

According to one aspect of the invention, a high speed high resolution heterodyne interferometric method is proposed which comprise the steps of:
(a) providing two parallel laser beams which are linear polarized laser beam having a 45° angle from the horizontal direction and with different frequencies $f_1$ and $f_2$;
(b) detecting one portion of each of the two laser beams by a photodiode and the result is then converted to a reference signal having a frequency ($f_b$), where $f_b = f_1 - f_2$;
(c) dividing the other portion of each of the two laser beams into a reference beam and a measurement beam by a polarizing beam splitter;
(d) directing the two reference beams with different frequencies $f_1$ and $f_2$ respectively through a reference prism reflector to a reference reflector by means of which they are reflected back to the polarizing beam splitter;
(e) directing the two measurement beams with different frequencies $f_1$ and $f_2$ respectively through a quarter wave plate to a plane mirror by which they are reflected back through the quarter wave plate to the polarizing beam splitter by which they are reflected to the measurement reflector and by the measurement reflector to the polarizing beam splitter again, at the polarizing beam splitter they are reflected to pass through the quarter wave plate and are then reflected by the plane mirror so as to further pass through the quarter wave plate and are then pass through the polarizing beam splitter;
(f) adjusting the reference reflector and the measurement reflector such that the measurement beam with frequency $f_1$ interferes with the reference beam with frequency $f_2$ whereby a first measurement signal $I_{m1}$ of frequency $f_b + \Delta f$ is generated; and that the measurement beam with frequency $f_2$ interferes with the reference beam with frequency $f_1$, whereby a second measurement signal $I_{m2}$ of frequency $f_b - \Delta f$ is generated;
(g) detecting the two measurement signals at two photodiodes respectively and the respective results are then transferred to a first phasemeter for processing the first measurement signal $I_{m1}$ and to a second phasemeter for processing the second measurement signal $I_{m2}$ respectively;
(h) selecting between the first phasemeter and the second phasemeter by a switching circuit according to the direction and speed of the movement of the plane mirror;
(i) calculating the displacement of the measuring subject according to the output of the selected phasemeter.

The first phasemeter is selected when the plane mirror moves towards the polarizing beam splitter at a speed which exceeds a first preset speed $V_1$, and the second phasemeter is selected when the plane mirror moves away from the polarizing beam splitter at a speed which exceeds a second preset speed $V_2$.

The two laser beams are provided by a single laser source.

According to a second aspect the present invention, a high speed high resolution heterodyne interferometric system is proposed. In this system, a frequency stabilized laser provided as a light source of the heterodyne interferometric system; a polarizing beam splitter provided to divide the laser beams from said frequency stabilized laser; a right angle prism provided to reflect the laser beams reflected by said polarizing beam splitter; a reference reflector provided to reflect the laser beams from said right angle prism; a quarter wave plate provided to change the polarization of the laser beams transmitted by said polarizing beam splitter; a plane mirror provided to reflect the laser beams from the said quarter wave plate; a measurement reflector provided to reflect the laser beams reflect by said polarizing beam splitter and placed on the opposite direction of said polarizing beam splitter with respect to right angle prism; a first photodiode provided to detect one the measurement beam of the heterodyne interferometric system; a second photodiode provided to detect the other the measurement beam of the heterodyne interferometric system; a first phasemeter provided to measure the measurement signal from said first photodiode and the reference signal from said frequency stabilized laser; a second phasemeter provided to measure the measurement signal from said second photodiode and the reference signal from said frequency stabilized laser; a switching circuit provided to measure the signal from said first phasemeter or said second phasemeter; a measurement circuit provided to process the signal from said switching circuit.

Said reference reflector is a retroreflector and said measurement reflector is a right angle prism.

Said reference reflector is a right angle prism and said measurement reflector is a retroreflector.

Said reference reflector is composed of two retroreflectors and said measurement reflector is a retroreflector.

Said reference reflector is a retroreflector and said measurement reflector is composed of two retroreflectors.

The side length of said right angle prism equals to the side length of the polarizing beam splitter.

The features and advantages of this invention are shown as detailed below:

(1) The measurement beam and the reference beam in this method and system are spatially separated, which eliminates the frequency and polarization mixing effects. As a result, the periodic nonlinearity is eliminated.

(2) The measurement signals have opposite Doppler shift for the same target movement. One of the two measurement signals is used selectively according to the direction of the target movement, so that the Doppler shift always increases the beat frequency of the selected signal. As a result, the interferometer can measure a high speed target by using a laser source with low beat frequency.

(3) The measurement circuit can produce high resolution measurements with an ordinary electric clock signal, which make the measurement circuit simple and easy to realize with low cost components.

BRIEF DESCRIPTION OF THE DRAWINGS

IN THE DRAWINGS,

The FIGURE: construction of the high speed high resolution heterodyne interferometric system proposed in preferred embodiment;

Specification of piece numbers in the FIGURE: 1 frequency stabilized laser, 2 polarizing beam splitter, 3 measurement reflector, 4 quarter wave plate, 5 plane mirror, 6 right angle prism, 7 reference reflector, 8 photodiode A, 9 photodiode B, 10 phasemeter A, 11 phasemeter B, 12 switching circuit, 13 measurement circuit.

PREFERRED EMBODIMENTS OF THE INVENTION

As shown in the FIGURE, a high speed high resolution heterodyne interferometric system, which comprises: a frequency stabilized laser 1 provided as a light source of the heterodyne interferometric system; a polarizing beam splitter 2 provided to divide the laser beams from said frequency stabilized laser 1; a right angle prism 6 provided to reflect the laser beams reflected by said polarizing beam splitter 2; a reference reflector 7 provided to reflect the laser beams from said right angle prism 6; a quarter wave plate 4 provided to change the polarization of the laser beams transmitted by said polarizing beam splitter 2; a plane mirror 5 provided to reflect the laser beams from the said quarter wave plate 4; a measurement reflector 3 provided to reflect the laser beams reflect by said polarizing beam splitter 2 and placed on the opposite direction of said polarizing beam splitter 2 with respect to right angle prism 6; a photodiode A 8 provided to detect one the measurement beam of the the heterodyne interferometric system; a photodiode B 9 provided to detect the other the measurement beam of the heterodyne interferometric system; a phasemeter A 10 provided to measure the measurement signal from said photodiode A 8 and the reference signal from said frequency stabilized laser 1; a phasemeter B 11 provided to measure the measurement signal from said photodiode B 9 and the reference signal from said frequency stabilized laser 1; a switching circuit 12 provided to measure the signal from said phasemeter A 10 or said phasemeter B 11; a measurement circuit 13 provided to process the signal from said switching circuit 12.

A high speed high resolution heterodyne interferometric method, which comprise the steps of:

(a) providing two parallel laser beams which are linear polarized laser beam having a 45° angle from the horizontal direction and with different frequencies $f_1$ and $f_2$;

(b) detecting one portion of each of the two laser beams by a photodiode and the result is then converted to a reference signal having a frequency ($f_b$), where $f_b = f_1 - f_2$;

(c) dividing the other portion of each of the two laser beams into a reference beam and a measurement beam by a polarizing beam splitter;

(d) directing the two reference beams with different frequencies $f_1$ and $f_2$ respectively through a reference prism reflector to a reference reflector by means of which they are reflected back to the polarizing beam splitter;

(e) directing the two measurement beams with different frequencies $f_1$ and $f_2$ respectively through a quarter wave plate to a plane mirror by which they are reflected back through the quarter wave plate to the polarizing beam splitter by which they are reflected to the measurement reflector and by the measurement reflector to the polarizing beam splitter again, at the polarizing beam splitter they are reflected to pass through the quarter wave plate and are then reflected by the plane mirror so as to further pass through the quarter wave plate and are then pass through the polarizing beam splitter;

(f) adjusting the reference reflector and the measurement reflector such that the measurement beam with frequency $f_1$ interferes with the reference beam with frequency $f_2$ whereby a first measurement signal $I_{m1}$ of frequency $f_b + \Delta f$ is generated; and that the measurement beam with frequency $f_2$ interferes with the reference beam with frequency $f_1$, whereby a second measurement signal $I_{m2}$ of frequency $f_b - \Delta f$ is generated;

(g) detecting the two measurement signals at two photodiodes respectively and the respective results are then transferred to a phasemeter A for processing the first measurement signal $I_{m1}$ and to a phasemeter B for processing the second measurement signal $I_{m2}$ respectively;

(h) selecting between the phasemeter A and the phasemeter B by a switching circuit according to the direction and speed of the movement of the plane mirror, said switching circuit selects phasemeter B when the plane mirror moves away from the polarizing beam splitter and the speed exceeds a preset value $V_1$, said switching circuit selects phasemeter A when the plane mirror moves close to the polarizing beam splitter and the speed exceeds a preset value $V_2$, the two phasemeters have overlapping detection range, the switching circuit doesn't operate in the common detection range to prevent the switching chattering phenomenon;

(i) calculating the displacement of the measuring subject according to the output of the selected phasemeter.

What is claimed is:

1. A high speed high resolution heterodyne interferometric method comprising following steps:
   (a) providing two parallel laser beams which are linear polarized laser beam having a 45° angle from the horizontal direction and with different frequencies $f_1$ and $f_2$;
   (b) detecting a portion of each laser beam by a photodiode and the detected result is then converted to a reference signal having a frequency ($f_b$), where $f_b=f_1-f_2$;
   (c) dividing a rest portion of the each laser beam into a reference beam and a measurement beam by a polarizing beam splitter;
   (d) directing the two reference beams with different frequencies $f_1$ and $f_2$ respectively to run a light path as follows: a reference prism reflector to a reference reflector to be reflected back to the polarizing beam splitter;
   (e) directing the two measurement beams with different frequencies $f_1$ and $f_2$ respectively to run a light path as follows: to pass a quarter wave plate to a plane mirror, to be reflected back through the quarter wave plate to the polarizing beam splitter, to be reflected to a measurement reflector and to be reflected to the polarizing beam splitter again, to be reflected to pass through the quarter wave plate and then be reflected by the plane mirror, further to pass through the quarter wave plate and then to pass through the polarizing beam splitter;
   (f) adjusting the reference reflector and the measurement reflector to realize that the measurement beam with frequency $f_1$ interferes with the reference beam with frequency $f_2$ to generate a first measurement signal $I_{m1}$ of frequency $f_b+\Delta f$, and the measurement beam with frequency $f_2$ interferes with the reference beam with frequency $f_1$ to generate a second measurement signal $I_{m2}$ of frequency $f_b-\Delta f$;
   (g) detecting the first and second measurement signals at two photodiodes respectively and the respective results are then transferred to a first phasemeter for processing the first measurement signal $I_{m1}$ and to a second phasemeter for processing the second measurement signal $I_{m2}$ respectively;
   (h) selecting between the first phasemeter and the second phasemeter by a switching circuit according to a direction and speed of a movement of a plane mirror;
   (i) calculating a displacement of a subject measured according to an output of the selected phasemeter.

2. The method as claimed in claim 1, wherein the first phasemeter is selected when the plane mirror moves towards the polarizing beam splitter at a speed which exceeds a first preset speed $V_1$ and the second phasemeter is selected when the plane mirror moves away from the polarizing beam splitter at a speed which exceeds a second preset speed $V_2$.

3. The method as claimed in claim 1, wherein the two laser beams are provided by a single laser source.

* * * * *